INVENTOR
ROBERT W. McKINNEY

ATTORNEY

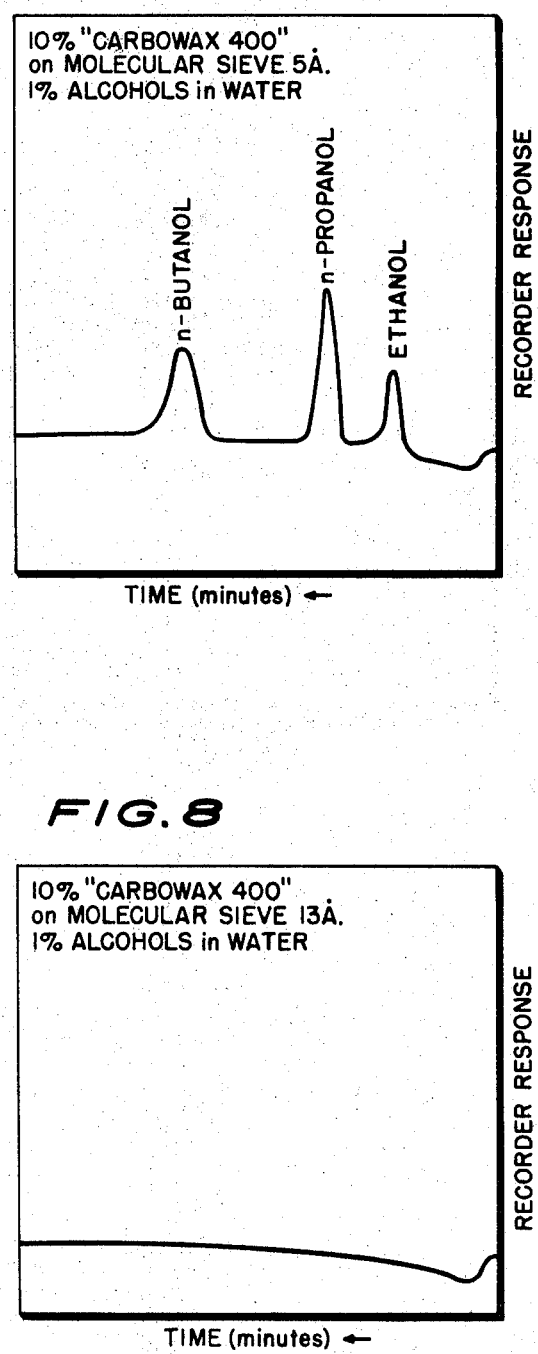
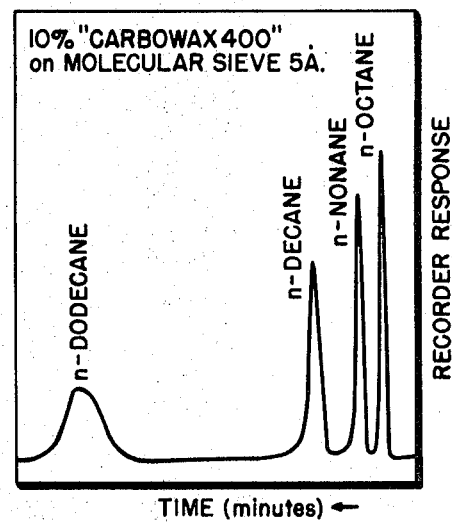
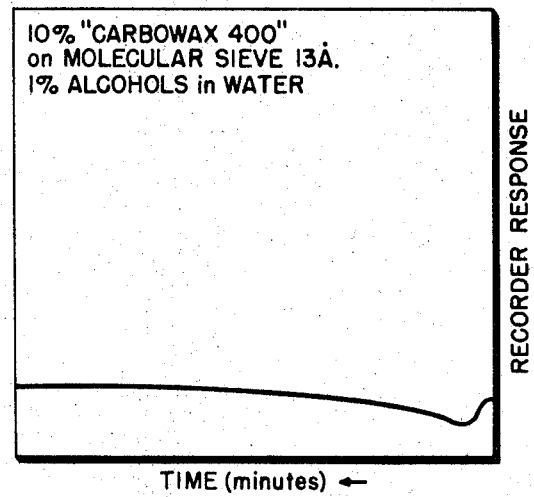
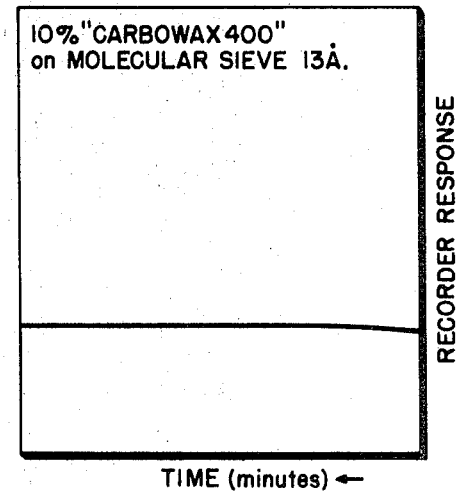

United States Patent Office 3,557,531
Patented Jan. 26, 1971

3,557,531
GAS-LIQUID CHROMATOGRAPHY METHOD
Robert W. McKinney, Adelphi, Md., assignor to W. R. Grace & Co., New York, N.Y., a corporation of Connecticut
Continuation-in-part of abandoned application Ser. No. 724,670, Mar. 29, 1968, which is a continuation-in-part of abandoned application Ser. No. 611,854, Jan. 26, 1967. This application June 5, 1969, Ser. No. 863,000
Int. Cl. B01d *15/08*
U.S. Cl. 55—67
5 Claims

ABSTRACT OF THE DISCLOSURE

The invention relates to a gas-liquid chromatography system utilizing, as the packing material, a coated synthetic molecular sieve having a pore diameter of less than 13 angstrom units. The packing is particularly useful with aqueous samples as the packing removes the water peak from the chromatogram.

BACKGROUND OF THE INVENTION

Figure 1:
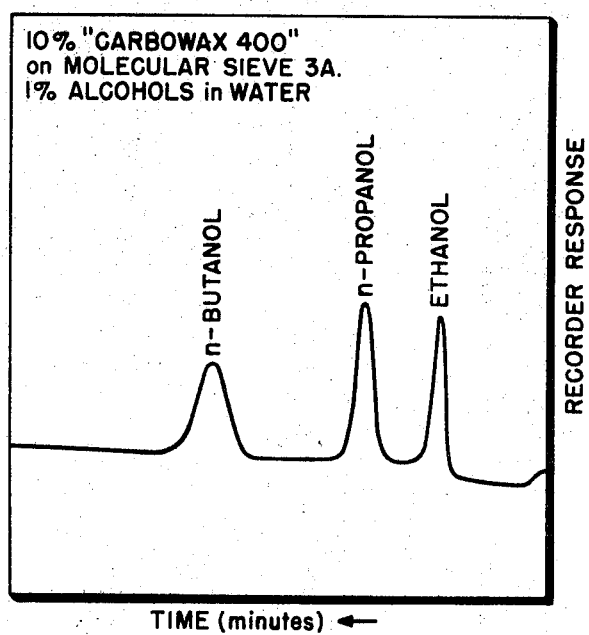

This application is a continuation-in-part of our earlier filed application Ser. No. 724,670, filed Mar. 29, 1968, of our earlier filed application Ser. No. 611,854, filed Jan. 26, 1967, now abandoned.

(1) Objects of the invention

It is an object of the present invention to provide an inexpensive column packing material which is suitable the packing removes the water peaks from the chromatograms and which can be used in a process for the separation of complex organic mixtures by the use of such packing material. Other objects will become apparent as the description of the invention proceeds.

(2) Prior art

Gas chromatography is that branch of chromatography in which the mobile phase is a gas and is classified according to the nature of the stationary phase used. The two types of gas chromatography are gas-solid chromatography and gas-liquid chromatography. Gas-solid chromatography utilizes a solid with an active surface and gas-liquid chromatography utilizes a liquid coating on a solid support. The present invention relates to gas-liquid open-chromatography. For a complete description of the field see "Gas-Liquid Chromatography," Nogare and Juvet, (1962), Interscience Publishers.

In general, a gas liquid chromatographic measurement is taken as follows. A sample, usually liquid or gaseous, is introduced into a sample injector where it is vaporized and swept into a column by the carrier gas. The column consists of a support material coated with an organic material of relatively low volatility. Ideally, the components of the sample travel through the column at different rates and are separated into individual components. As each component emerges its concentration is measured by a suitable detector. The detector translates the change in concentration to an electrical signal which is continuously recorded.

The column is the heart of the gas-liquid chromatographic operation and is a glass, plastic or metal tube filled with column packing. The packing is the stationary phase and consists of a solid support covered with a liquid phase. The liquid phase is a relatively nonvolatile liquid at column operating temperatures and serves to dissolve the sample components. The separation of the sample components depends on the following: (1) the difference of the volatility of the various components in the solution and (2) solubility and/or interaction with the nonvolatile liquid phase. The solid support is normally an inert porous solid. The most commonly used inert support material is diatomaceous earth. While this material has proven satisfactory for most analyses, it frequently cannot be used in the presence of appreciable amounts of water.

BROAD DESCRIPTION OF THE INVENTION

The objects of this invention are accomplished by the use of a packing composition for gas chromatography columns which comprises a liquid phase adsorbed on a synthetic molecular sieve having a pore diameter of less than 13 angstrom units. The use of such packing composition eliminates water peaks from the chromatographs when aqueous samples are used in gas-liquid chromatography. The use of the active support material (the synthetic molecular sieve) is crucial to this invention.

The present invention also provides an improvement in the separation of complex organic mixtures by gas chromatography systems, wherein the separating medium consists of a support material coated with an organic material or silicone of low volatility, the improvement comprising using a synthetic molecular sieve having a pore diameter of less than 13 angstrom units as the support material.

The present invention also provides an improvement in the separation of complex organic mixtures by gas chromatography systems, wherein the separating medium consists of a support material coated with an organic material or silicon of low volatility, the improvement comprising using a synthetic molecular sieve having a pore diameter of less than 13 angstrom units as the support material.

In a preferred embodiment of the present invention, the synthetic molecular sieve has a pore diameter of not greater than about 5 angstrom units, and a particle size of from about 40 to about 150 mesh, more preferably, from about 50 to about 120 mesh. In a still more preferred embodiment, the particle size is from about 55 to about 90 mesh.

DETAILED DESCRIPTION OF THE INVENTION

The "molecular sieves" employed in the present invention are well known in the art and are often described as three dimensional structures having a network of relatively large cages interconnected with small openings or pores (see U.S.P. 2,930,447 and "Chemical Week," Jan. 26, 1963, pages 37 to 48). The "organic material of low volatility" employed in the present invention can be any of the conventional organic materials used to coat such columns. Among such materials are the paraffins, chlorocarbons, silicones, organic esters, alcohols, heterocyclic amines, polyhydroxy compounds, polyglycols and many mixed materials supplied commercially for this purpose. The "silicone of low volatility" can be any of the conventional silicones used to coat such columns.

In the present invention, the synthetic molecular sieves and the organic material or silicone of low volatility are used as the active packing material or active support material. In general, the organic material of nonvolatility is first dissolved in a suitable volatile organic solvent such as methanol, chloroform, ethanol or the like. The packing material is then added to the solution and the solution heated until the solvent evaporates giving a substantially uniform coating on the synthetic molecular sieve. The packing material is then put in the column and the column is ready for use. The analysis is then carried out by methods well known in the art.

The various FIGS. (1 to 9) illustrate this invention, showing the elimination of the water peak from the chromatographs.

EXAMPLE 1

Approximately 100 grams of a molecular sieve having a pore diameter of about 3 angstroms units and a particle size of about 1/8 inch is crushed using a mortar and pestle. The crushed material is then screened to obtain a −40 to +60 mesh fraction which is used in the examples.

5 grams of "Carbowax 400" are dissolved in chloroform and 45 grams of the above-described synthetic molecular sieve fraction are added to the "Carbowax 400"—solvent mixture and slurried on the steam bath until the chloroform has evaporated. The resulting column packing material is 10 percent by weight of "Carbowax 400" coated onto the molecular sieve support. The coated molecular sieve is placed in the stainless steel column (1/4 in. dia. and 3 ft. in length) of the above-described chromatograph.

A mixture of 1 percent ethanol, 1 percent n-propanol, 1 percent n-butanol and 97 percent water is utilized as a test sample. The analysis is run at a temperature of 100° C. with helium as the carrier gas at a flow rate of 60 cc. per minute. The results of the analysis are shown in FIG. 1.

As a control, a 10 percent by weight "Carbowax 400" on a conventional diatomaceous earth packing ("Chromosorb P," Johns-Manville Co.) is prepared in the same manner as the "Carbowax 400" molecular sieve coated packing described above. The material is packed into the stainless steel column (1/4 in. diameter and 3 feet in length) of the chromatograph and utilized under the identical conditions as the coated molecular sieve above.

Figure 2:
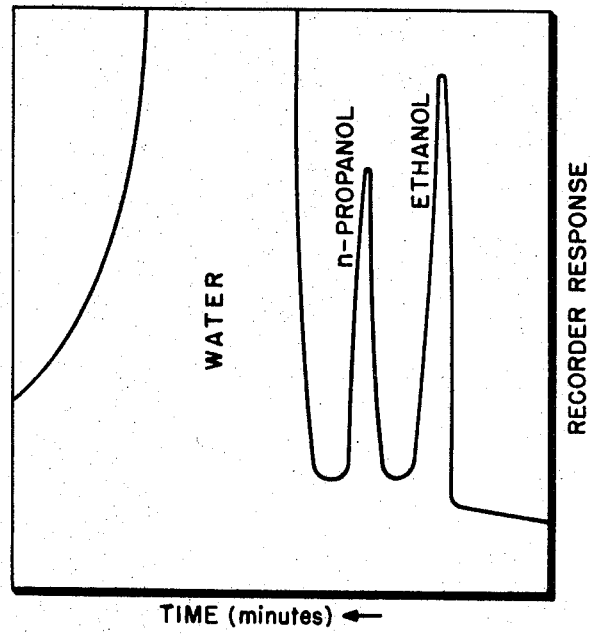

The results of the analysis are shown in FIG. 2.

As shown by the chromatogram of FIG. 1, the presence of 97 percent water in the test sample does not interfere with the analysis when the molecular sieve is utilized as the support material in the chromatograph column. As shown by the chromatogram of FIG. 2, water does interfere with the analysis when diatomaceous earth is used as the support material since the water peak, which is large and generally nonsymmetrical, completely obscured the n-butanol peak on the chromatogram.

EXAMPLE 2

The procedure of Example 1 is repeated to give a chromatography column packed with the coated molecular sieve.

A mixture of n-octane, n-nonane, n-decane and n-dodecane in a weight ratio of 1:1:1:1 is utilized as a test sample. The analysis is run at a temperature of 100° C. with helium as the carrier gas at a flow rate of 60 cc. per minute. The results of the analysis are shown in FIG. 3.

As a control, the procedure of Example 1 is repeated to give a chromatograph having a column packed with the "Carbowax 400" on diatomaceous earth. The chromatograph is then utilized to analyze the above mixture of n-octane, n-nonane, n-decane and n-dodecane. The results of the analysis are shown in FIG. 4.

Figure 3:
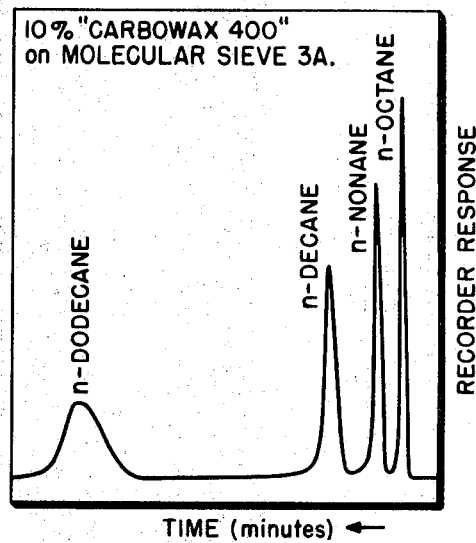
Figure 4:
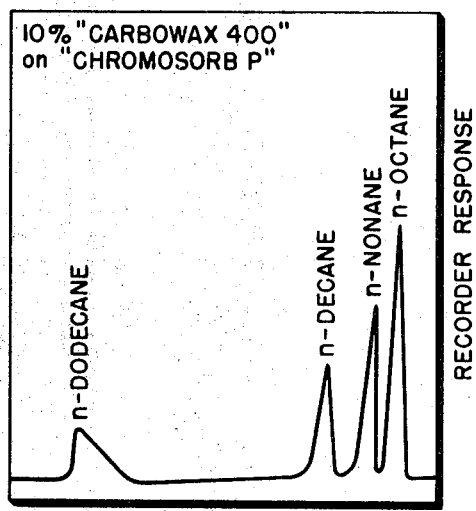

As shown by the chromatograms of FIGS. 3 and 4, the coated molecular sieve gives as good an analysis as the conventional diatomaceous earth packing currently being used in the art.

EXAMPLE 3

The procedure of Example 1 is repeated to obtain the −40 to +60 mesh fraction of the molecular sieve of Example 1.

2 grams of "Ethofat" (polyoxyethylene monostearate), and 1 gram of isophthalic acid are dissolved in methanol and 47 grams of the synthetic molecular sieve fraction is then added. The mixture is slurried on the steam bath until the methanol has evaporated. The resulting packing material contains 4 percent "Ethofat" and 2 percent isophthalic acid coated onto the molecular sieve support. The coated molecular sieve is placed in the column of the chromatograph as described in Example 1.

A mixture of methyl esters containing equal parts by weight of methyl acetate, methyl hexanoate, methyl octanoate, dimethyl succinate, dimethyl glutarate and methyl decanoate is utilized as the test sample. The analysis is run at a temperature of 150° C. with helium as the carrier gas at a flow rate of 60 cc. per minute. The results of the analysis are shown in FIG. 5.

Figure 5:
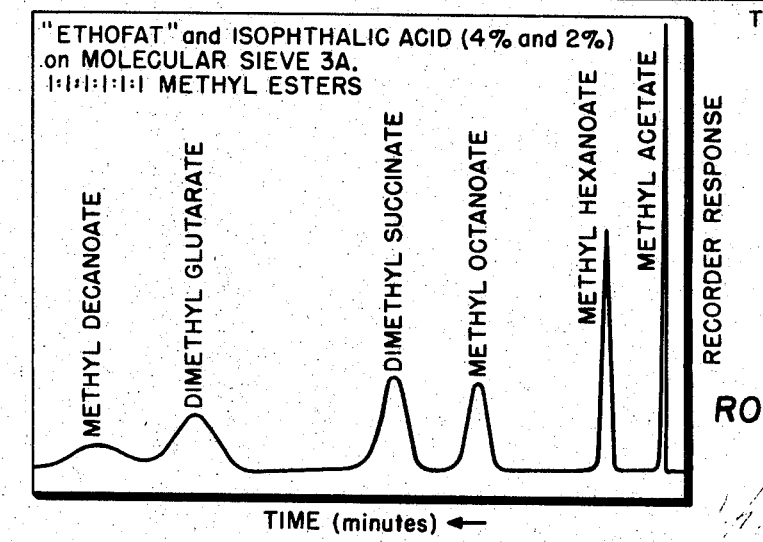

As shown in the chromatogram of FIG. 5, the coated molecular sieve is suitable for the analysis of other organic materials such as methyl esters.

EXAMPLE 4

The procedure of paragraphs 1, 2 and 3 of Example 1 is repeated employing a molecular sieve having a pore diameter of 5 angstrom units. The results of the analysis are shown in FIG. 6.

As shown by the chromatogram of FIG. 6, the presence of water does not interfere with the analysis when a molecular sieve having a pore diameter of 5 angstrom units is utilized as a support material.

EXAMPLE 5

The procedure of paragraphs 1 and 2 of Example 1 is repeated utilized a molecular sieve having a pore diameter of 5 angstrom units.

A mixture of n-octane, n-nonane, n-decane and n-dodecane in a weight ratio of 1:1:1:1 is utilized as a test sample. The analysis is run at a temperature of 100° C. with helium as the carrier gas at a flow rate of 60 cc. per minute. The results of the analysis are shown in FIG. 7.

As shown by the chromatogram of FIG. 7, the coated molecular sieve is suitable for the analysis of hydrocarbons. The same molecular sieve when it is uncoated is not suitable for the same analysis.

EXAMPLES 6 AND 7

The procedure of Examples 4 and 5 is repeated employing a molecular sieve having a pore diameter of 13 angstrom units. The results of the analysis of the alcohols are shown in FIG. 8 and the results for the hydrocarbons are shown in FIG. 9.

As can be seen from the chromatograms, a molecular sieve having a pore diameter of 13 angstrom units is not suitable for these separations. Thus, the molecular sieve must have a port diameter of less than 13 angstrom units.

While in the above examples only a limited number of organic compounds are separated by gas-liquid chromatography, it would be obvious to those skilled in the art that the packing material of the present invention would have a wide variety of uses for the analysis of other organic materials. The packing material of the present invention is particularly useful when substantial amounts of water are present in the samples since the packing prevents the water from interfering with the analysis.

The packing materials of the present invention may be utilized in admixture with other conventional materials since, in general, the whole column need not be packed with the present material in order to remove the moisture of the samples. When only trace amounts of water are present only a small amount of packing material of the present invention is required to remove the water peak from the chromatogram.

Many equivalent modifications and variations of the present invention will be apparent to those skilled in the art from a reading of the foregoing without a departure from the inventive concept.

What is claimed is:

1. A separation process which comprises passing a gaseous test sample containing water and complex organic compounds through a gas-liquid chromatography column packed with a packing composition characterized with means for eliminating water peaks from chromatographs, said means consisting of a substantially uniform coating of a liquid phase adsorbed on synthetic molecular sieve packing having a pore diameter of less than 13 angstrom units and a sieve particle size of from about 40 to about 150 mesh; generating signals for components forming the test sample absent a signal for water; and recording the generated signals as peaks on a chromatograph.

2. The separation process of claim 1 wherein the synthetic molecular sieve has a particle size of from about 50 to about 120 mesh.

3. The separation process of claim 1 wherein the synthetic molecular sieve has a particle size of from about 55 to about 90 mesh.

4. The separation process as described in claim 1 wherein the synthetic molecular sieve has a pore diameter of not greater than about 5 angstrom units.

5. The separation process as described in claim 1 wherein the synthetic molecular sieve is coated with a substance selected from the group consisting of organic materials of low volatility and silicones of low volatility.

References Cited
UNITED STATES PATENTS

| | | | |
|---|---|---|---|
| 3,035,383 | 5/1962 | Sanford et al. | 55—67X |
| 3,223,747 | 12/1965 | Bohrer | 55—67X |
| 3,242,641 | 3/1966 | Makin | 55—75X |

J. L. DeCESARE, Primary Examiner

U.S. Cl. X.R.

55—75